(12) United States Patent
Hirose et al.

(10) Patent No.: US 7,533,104 B2
(45) Date of Patent: May 12, 2009

(54) INFORMATION MANAGEMENT SYSTEM AND INFORMATION MANAGEMENT METHOD

(75) Inventors: Yoshitsugu Hirose, Kanagawa (JP); Tsutomu Ishii, Kanagawa (JP); Ikutaroh Nagatsuka, Kanagawa (JP); Minoru Koshimizu, Kanagawa (JP); Tsunemasa Mita, Kanagawa (JP); Yasunori Saito, Kanagawa (JP); Hiroyuki Hotta, Kanagawa (JP); Eriko Tamaru, Kanagawa (JP); Kimitake Hasuike, Kanagawa (JP); Hiroyuki Hattori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 545 days.

(21) Appl. No.: 10/962,696

(22) Filed: Oct. 13, 2004

(65) Prior Publication Data

US 2005/0207727 A1 Sep. 22, 2005

(30) Foreign Application Priority Data

Mar. 18, 2004 (JP) ............................. 2004-077570

(51) Int. Cl.
G06F 7/00 (2006.01)
G06F 17/00 (2006.01)

(52) U.S. Cl. .......................................... 707/100; 707/1

(58) Field of Classification Search ............... 707/1–10, 707/100–104.1, 200–206; 715/500.1, 526, 715/201, 273
See application file for complete search history.

(56) References Cited

U.S. PATENT DOCUMENTS

| | | | |
|---|---|---|---|
| 6,772,150 B1 * | 8/2004 | Whitman et al. | ................ 707/6 |
| 2002/0059406 A1 * | 5/2002 | Tanaka et al. | ................ 709/223 |
| 2004/0002946 A1 * | 1/2004 | Yamaguchi | .................... 707/1 |

FOREIGN PATENT DOCUMENTS

JP  A 7-121529  5/1995

OTHER PUBLICATIONS

Stockton, Portable electronic storage systems, Feb. 1994, IEEE, vol. 14, 69-76.*
Chee et al., Improving I/O response times via prefetching and storage system reorganization, Aug. 13-15, 1997, IEEE, 143-148.*

* cited by examiner

*Primary Examiner*—Jean Bolte Fleurantin
(74) *Attorney, Agent, or Firm*—Oliff & Berridge, PLC (57) ABSTRACT

An information management system which enables analysis on basis of a processing history of content with use of a portable displaying-and-recording medium, includes a log recording function of managing user identification data to specify a user who owns the portable displaying-and-recording medium and content identification data to specify content, and recording the user identification data and the content identification data in an associated manner after the user performs processing of the content. Preferably, the portable displaying-and-recording medium records/retains data in a state where content is displayed and is capable of rewriting the content.

13 Claims, 9 Drawing Sheets

LIGHT

INFORMATION MANAGEMENT SYSTEM AND INFORMATION MANAGEMENT METHOD

BACKGROUND OF THE INVENTION

1. Field of the Invention

The present invention relates to a technique which allows analysis of actions of a user or changes in a portable displaying-and-recording medium, or the like, on the basis of a processing history of content in an environment making use of the portable displaying-and-recording medium which records/retains data in a state where the content is displayed.

2. Description of the Related Art

Content is a document constituted of, for instance, a picture, painting, drawing, or text alone, or a combination of text and an image, such as a picture, and assumes the form of data which allow the user to perform browsing operation, creating operation, editing operation, or the like, by means of a data processor.

A typical usage pattern of such content is such that content is distributed on the network, received by a data processing device, such as a personal computer, and displayed on a display screen of the data processing device for a user's browse.

An invention which has been proposed aims at managing exchanges, such as comments, applied by users to the document during the process of creating or editing an electronic document in the form of a meta-paper section so as to support communications between users, thereby making good use of the meta-paper section (see JP-A-7-121529).

The term "electronic paper" referred to in the above proposal denotes a section of an electronic document, and a section visualized and presented to a user for the purpose of discriminating from the meta-paper section, and differs from an electronic paper serving as a portable displaying-and-recording medium according to the invention, which will be described hereinafter.

SUMMARY OF THE INVENTION

In terms of a basic function of content, such as a document, content is means for data transmission between users. Therefore, it can be said that, as shown in the above proposal, communication between users can be smoothed by management of additional data added by the users during the process of creating or editing a document, in such a manner that such data can be utilized while being associated with the document.

Meanwhile, content is utilized by means of creating, editing, and browsing, or the like (in terms of data processing, the creation process, the editing process, the display process, or the like). Accordingly, when content is used, some action of a user is entailed. When attention is paid to the above circumstances, actions of users involved in use of the content (in terms of data processing, the creation process, the editing process, the display process, or the like) can be grasped.

However, such a viewpoint itself has never been present, and user's actions stemming from utilization of content can be neither managed nor analyzed.

Meanwhile, a portable displaying-and-recording medium having a rewritable display section of photo-write type or electronic-write type is known. The portable displaying-and-recording medium is a paper-like, thin and flexible device, so-called "electronic paper", and a user can use the portable displaying-and-recording medium in much the same way as he/she handles a document printed on paper. More specifically, when a content image is displayed and recorded on a display section of such a portable displaying-and-recording medium, the portable displaying-and-recording medium is handled in much the same way as the content in a form of a document printed on a paper medium.

Accordingly, when content is used with a portable displaying-and-recording medium, actions of users involved in use of the content become more distinctive, and the medium provides considerably useful information for ascertaining and analyzing users' actions.

The present invention has been conceived in view of the above circumstances, and aims at enabling management, and further, analysis of actions of users involved in use of content, such as, display and recording of content in a portable displaying-and-recording medium, editing of content to be displayed and recorded in a portable displaying-and-recording medium, and replacement of a portable displaying-and-recording medium for displaying and recording content.

The present invention has been conceived on the basis of the above-mentioned novel point of view, and enables analysis of actions of users involved in use of content, by means of managing processing with regard to use of content with use of a portable displaying-and-recording medium.

In other words, in the invention, there is generated a log which allows analysis on the basis of a processing history of content. The analysis is effected by means of managing content identification data for specifying content, user identification data for specifying an owner user of the portable displaying-and-recording medium, and device identification data for specifying the portable displaying-and-recording medium in accordance with processing with regard to use of content. In the invention, user's actions involved in use of the content can be analyzed by means of searching the log.

More specifically, the invention manages the user identification data for specifying an owner user of the portable displaying-and-recording medium in which the content is displayed and recorded, and the content identification data for specifying content, and the user identification data and the content identification data are recorded in an associated manner as log entries after the user performs processing, such as display and recording of the content.

In a more specific mode, the portable displaying-and-recording medium notifies a management device of the user identification data and the content identification data when a user performs processing on the content. Upon notification from the portable displaying-and-recording medium, the management device records the user identification data and the content identification data in an associated manner along with time data after the user performs processing on the content.

Stored data in which the user identification data and the content identification data are stored in the form of log entries are searched, whereby a processing history of contents is output for each user, or a history of users is output for each content. Accordingly, changes in contents used by a certain user or changes in users involved in certain content can be ascertained, for instance, the nature of contents which have been displayed and recorded (i.e., browsed) by the respective users and the nature of the users who have used the content through use of a portable displaying-and-recording medium, thereby enabling ascertainment of the users' actions.

Furthermore, in the invention, the content identification data and the device identification data are managed, and the content identification data for recording/retaining the content in the portable displaying-and-recording medium and the device identification data are recorded as a log in an associated manner.

In a more specific mode, the portable displaying-and-recording medium notifies the management device of content identification data and the device identification data when content is recorded/retained in the portable displaying-and-recording medium. The management device records the content identification data for recording/retaining the content in the portable displaying-and-recording medium and the device identification data in an associated manner along with time data.

Stored data in which the content identification data and the device identification data are stored as log entries are searched, whereby a history of a portable displaying-and-recording medium—in which content has been retained—is output for each content, or a history of contents retained by the portable displaying-and-recording medium is output. Accordingly, the invention can analyze changes in portable displaying-and-recording media used for a certain content or changes in contents used by a certain portable displaying-and-recording medium, for instance, the nature of the portable displaying-and-recording media which have been used for displaying and recording the content or the nature of contents which have been displayed and recorded by the portable displaying-and-recording medium. In a use environment where the relationship between the portable displaying-and-recording medium and its user is defined or managed, the portable displaying-and-recording medium can also be considered as a corresponding user. Accordingly, the above analysis enables ascertainment of actions of the user.

In the invention, the device identification data of the portable displaying-and-recording medium and the user identification data for specifying an owner of the portable displaying-and-recording medium are managed, and the device identification data and the user identification data are stored in an associated manner as log entries after an owner of the portable displaying-and-recording media is changed.

In a more specific mode, the portable displaying-and-recording medium notifies the management device of the device identification data and the user identification data when the owner of a portable displaying-and-recording medium in which the content is stored is changed. Upon notification from the portable displaying-and-recording medium, the management device stores the device identification data and the user identification data in an associated manner along with time data after an owner of the portable displaying-and-recording medium for recording/retaining content is changed.

Stored data in which the device identification data and the user identification data are recorded as log entries are searched, whereby a history of owners of each portable displaying-and-recording medium or a history of portable displaying-and-recording media possessed by each user is output. Accordingly, changes in owners of a certain portable displaying-and-recording medium or changes in portable displaying-and-recording media possessed by a certain user can be analyzed, for instance, the nature of a user who has owned a portable displaying-and-recording media or the nature of the portable displaying-and-recording media possessed by a certain user. The result of the above analysis can also be utilized to associate the portable displaying-and-recording media with the users. The analysis result which is used for utilization of contents and pertains to the portable displaying-and-recording media and the user exhibits the actions of the user involved in the use of the content. For instance, there can be ascertained actions of a user who has borrowed a portable displaying-and-recording medium from another user (tentative possession) for utilizing content, or actions of a user who has exchanged a portable displaying-and-recording medium to another one of different type or function for utilizing content.

According to another aspect of the invention, an information management method which enables analysis on basis of a processing history of content with use of a portable displaying-and-recording medium, includes causing the portable displaying-and-recording medium to notify a management device of user identification data and content identification data when a user performs processing on content, and causing the management device to record, upon notification from the portable displaying-and-recording medium, the user identification data and the content identification data in an associated manner along with time data after the user performs processing on the content. Preferably, the portable displaying-and-recording medium records/retains data in a state where content is displayed and is capable of rewriting the content.

According to yet another aspect of the invention, an information management method which enables analysis on basis of a processing history of content with use of a portable displaying-and-recording medium, includes causing the portable displaying-and-recording medium to notify a management device of content identification data and device identification data when content is recorded/retained in the portable displaying-and-recording medium, and causing the management device to record, upon notification from the portable displaying-and-recording medium, the content identification data and the device identification data, in an associated manner along with time data after the content is recorded/retained in the portable displaying-and-recording medium. Preferably, the portable displaying-and-recording medium records/retains data in a state where content is displayed and is capable of rewriting the content.

According to still another aspect of the invention, an information management method which enables analysis on basis of a processing history of content with use of a portable displaying-and-recording medium, includes causing the portable displaying-and-recording medium to notify a management device of device identification data and user identification data when a user who owns the portable displaying-and-recording medium which records/retains content is changed, and causing the management device to record, upon notification from the portable displaying-and-recording medium, the device identification data and the user identification data, in an associated manner along with time data after the user who owns the portable displaying-and-recording medium which records/retains the content is changed. Preferably, the portable displaying-and-recording medium records/retains data in a state where content is displayed.

According to the present invention, a processing history of content with the use of a portable displaying-and-recording medium are managed by making use of content identification data, user identification data, and device identification data. Accordingly, management of actions of the user involved in utilization of content and analysis thereof are enabled.

BRIEF DESCRIPTION OF THE DRAWINGS

Preferred embodiments of the present invention will be described in detail based on the following figures, wherein.

DETAILED DESCRIPTION OF THE INVENTION

The present invention will be described specifically by reference to an embodiment.

First, an example of a data storage device for use with the invention will be described by reference to FIGS. 6A to 12.

Portable displaying-and-recording media can be broadly categorized, in terms of the recording method of recording/retaining content in a display section in a rewritable manner, into an external-write type, employing, for example, a write method in which content is written by means of external-photo-addressing as shown in FIGS. 6A to 9, and a self-write type having a wiring pattern for writing inside the medium per se shown in FIGS. 10A to 12. Both types are paper-like thin devices, so-called "electronic paper."

Figure 6A:
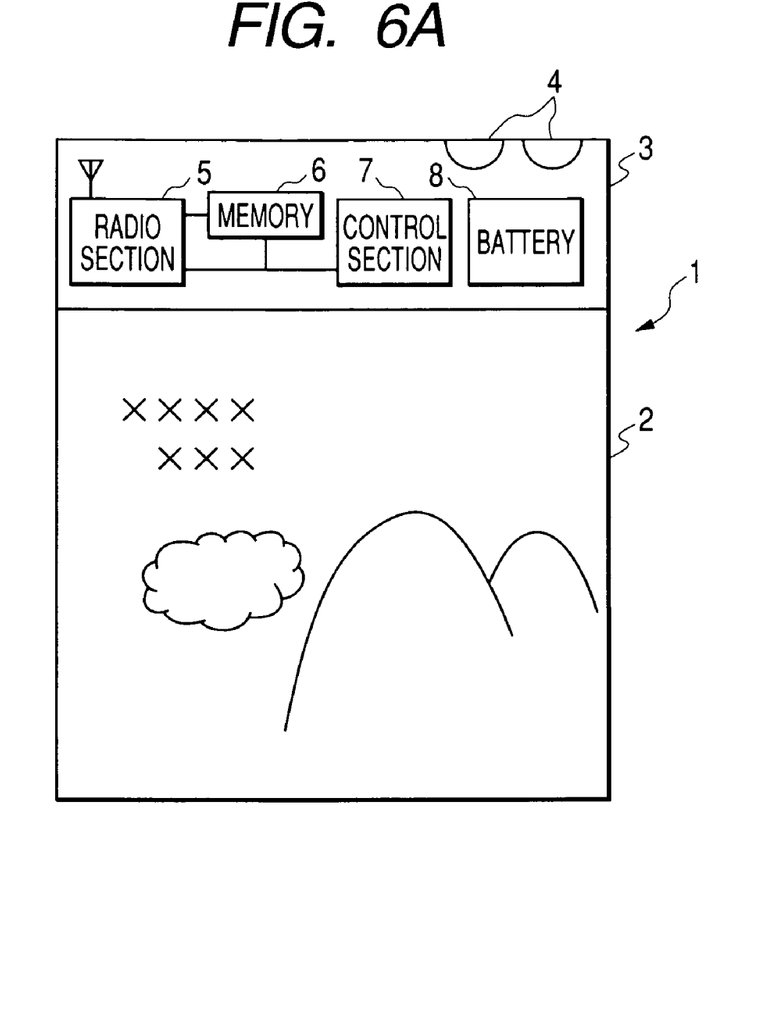
FIGS. 6A and 6B are diagrams showing an external-photo-write-type portable displaying-and-recording medium.
Figure 6B:
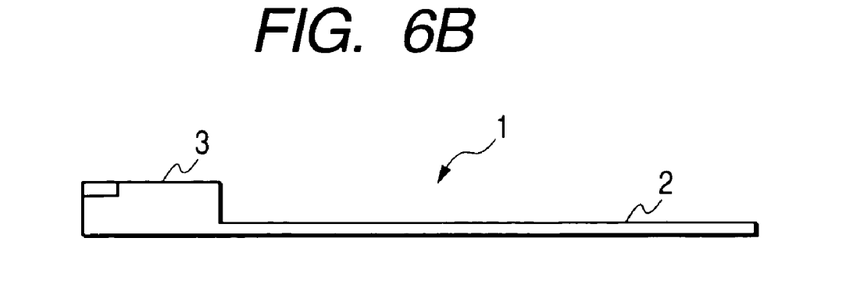

FIG. 6A shows a front view of an external-photo-write-type portable displaying-and-recording medium 1. FIG. 6B shows a side view of the portable displaying-and-recording medium 1. The portable displaying-and-recording medium 1 shown in the drawings has a display section 2 for displaying and retaining a content image, and a processing section 3 for processing electronic data. FIG. 6A also shows functional sections built into the processing section 3.

The external-photo-write-type portable displaying-and-recording medium 1 is of a size of, e.g., A-4 size paper, and is flexible and of low profile. The processing section 3 is disposed at one portion of the display section 2 which occupies most of the surface area of the data storage device 1. The display section 2 is of arbitrary size, and is assumed to be of a size suitable for the purpose.

The processing section 3 has electrodes 4 for applying voltage to drive the display section 2, as will be described later, a radio section 5 for conducting radio communication with the outside, a memory 6 for retaining electronic data in a readable/writable manner, a control section 7, such as a CPU, for executing processing functions according to the invention, and a battery 8 for supplying driving power to the radio section 5, memory 6, and the control section 7.

The external-photo-write-type portable displaying-and-recording medium 1 is capable of transceiving electronic data by means of radio communication between the radio section 5 and the outside device (unillustrated), and retaining the electronic data in the memory 6, as well as recording/retaining content image data which have been photo-written in the display section 2 in a displayed state.

Figure 7:
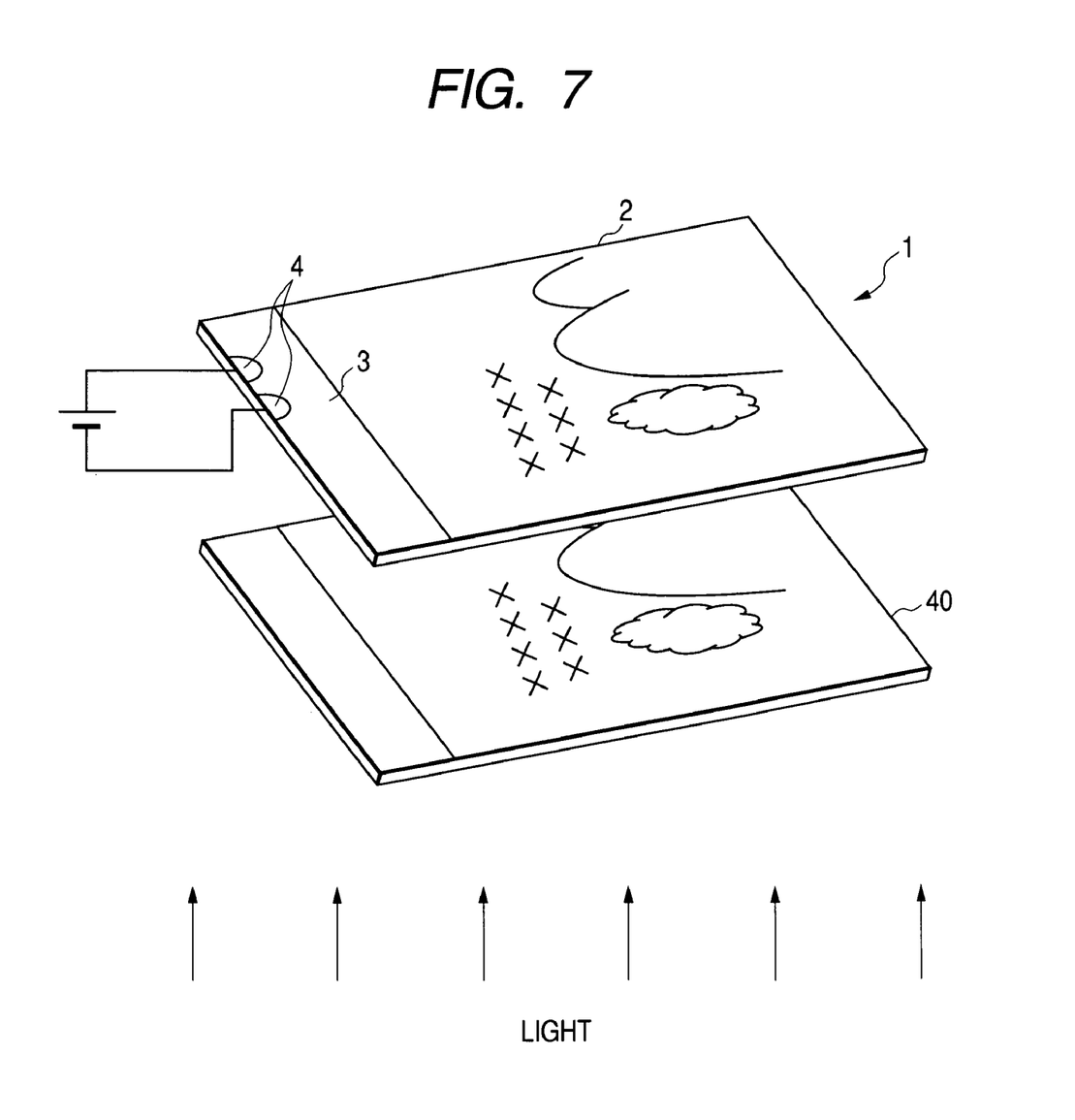
FIG. 7 is a diagram explaining how the external-photo-write-type portable displaying-and-recording medium is used.

For instance, as shown in FIG. 7, the external-photo-write-type portable displaying-and-recording medium 1 displays content, as an image, on a liquid crystal panel 40. Light is emitted on the external-photo-write-type portable displaying-and-recording medium 1 superposed on the liquid crystal panel 40 while voltage is applied on the electrodes 4 from an outside power source. Accordingly, the content image displayed on the liquid crystal panel 40 can be transferred onto the display section 2, and stored.

A content image of a document can also be transferred and stored by means of emitting light on a sheet of the document paper, such as a printed material, which is superposed on the external-photo-write-type portable displaying-and-recording medium 1 while voltage is applied on the electrodes 4. That is, the external-photo-write-type portable displaying-and-recording medium is capable of transferring the projected image data on the display section 2 by means of applying voltage on the electrodes 4 and retaining the image data in the displayed state even after the voltage applied on the electrodes 4 is removed.

Figure 9:
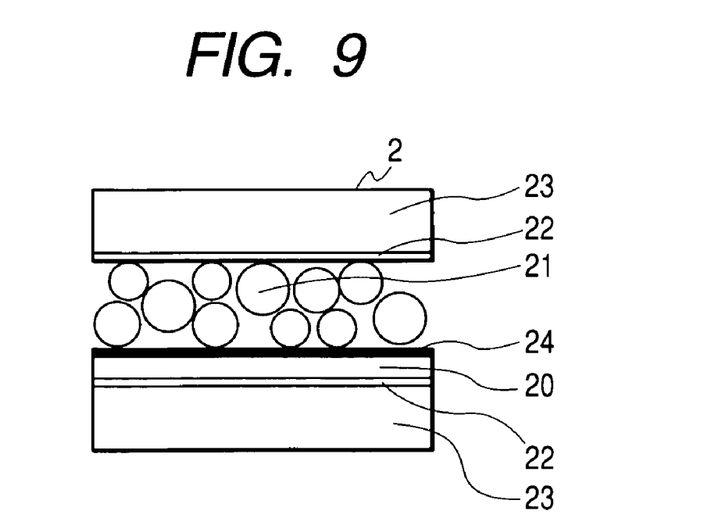
FIG. 9 is a diagram explaining a structure of the external-photo-write-type portable displaying-and-recording medium.

In terms of a cross-sectional structure of the display section 2 shown in FIG. 9, the external-photo-write-type portable displaying-and-recording medium 1 is configured as follows, a layer of liquid crystal display material (microencapsulated cholesteric liquid crystal layer) 21 and a photoconductor layer of organic material (hereinafter referred to as "organic photoconductor layer") 20—which are utilized in a copier—are combined and sandwiched between a pair of transparent electrodes 22 so as to form a laminated member, and the laminated member is sandwiched between a pair of transparent substrate films 23. In the illustrated example in which a monochrome image is displayed and retained, a black layer 24 is interposed between the cholesteric liquid crystal layer 21 and the organic photoconductor layer 20. However, by utilizing the characteristic of a cholesteric liquid crystal, a multi-color display can also be realized with a simple structure in which color lights are subjected to interference and reflection in accordance with a helical pitch.

Figure 8:
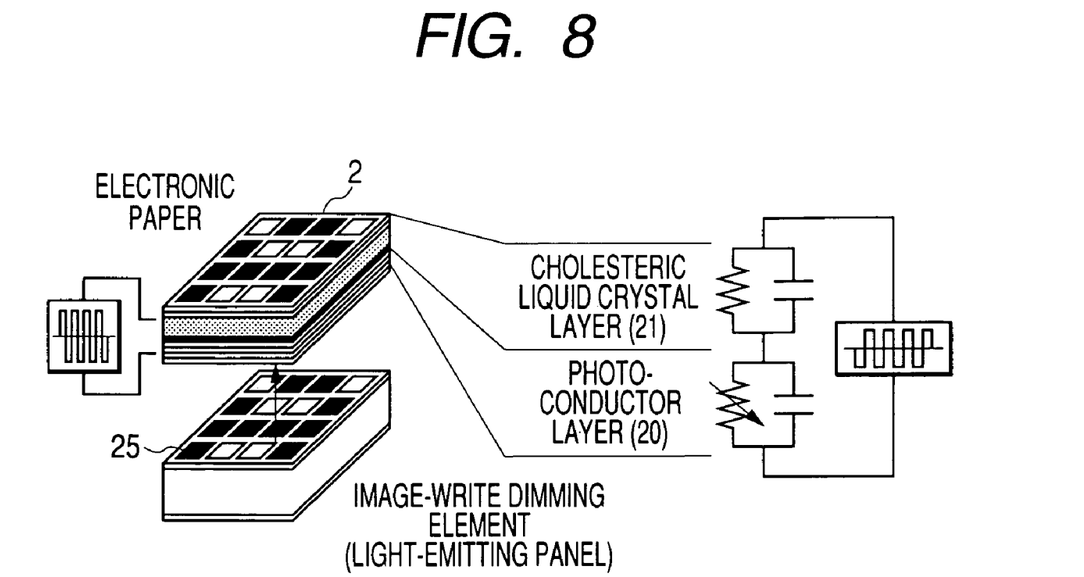
FIG. 8 is a diagram explaining operating principles of the external-photo-write-type portable displaying-and-recording medium.

As shown in FIG. 8, which illustrates the operating principles of the display section 2, the external-photo-write-type portable displaying-and-recording medium 1 projects an image to be transferred on, e.g., an image-write dimming element panel (a light-emitting panel) 25, and when voltage is applied on the electrodes 4, the external-photo-write-type portable displaying-and-recording medium 1 instantaneously converts differences in light intensity into reflection density, thereby retaining the thus-projected image. The image data retained in the display section 2 can be erased by application of erasing voltage on the electrodes 4. That is, the external-photo-write type portable displaying-and-recording medium is a rewritable displaying-and-recording medium permitting reuse by repeating writing and erasing.

As described above, the external-photo-write-type portable displaying-and-recording medium 1 has a characteristic of retaining image data transferred by means of image projection without power supply, in addition to being paper-thin and flexible. Therefore, the external-photo-write-type data storage device 1 is a displaying-and-recording medium which can be used as if it were paper for use with a printer or a copier, and which, moreover, permits repeated reuse.

Furthermore, the external-photo-write-type portable displaying-and-recording medium 1 of the embodiment includes a radio function and a notification function performed by means of the control section 7. Therefore, as will be described later by reference to FIG. 1, the external-photowrite-type portable displaying-and-recording medium 1 is capable of notifying a management device 50 of a content ID for identifying content displayed and retained in the display section 2, a user ID for identifying an owner user of the portable displaying-and-recording medium 1, and a device ID for identifying the portable displaying-and-recording medium 1. Accordingly, there is constituted an information management system which associates and manages these IDs under predetermined conditions, such as every time content is processed, every time content is recorded/retained in the portable displaying-and-recording medium 1, or every time an owner user of the portable displaying-and-recording medium 1 is changed.

Figure 10A:
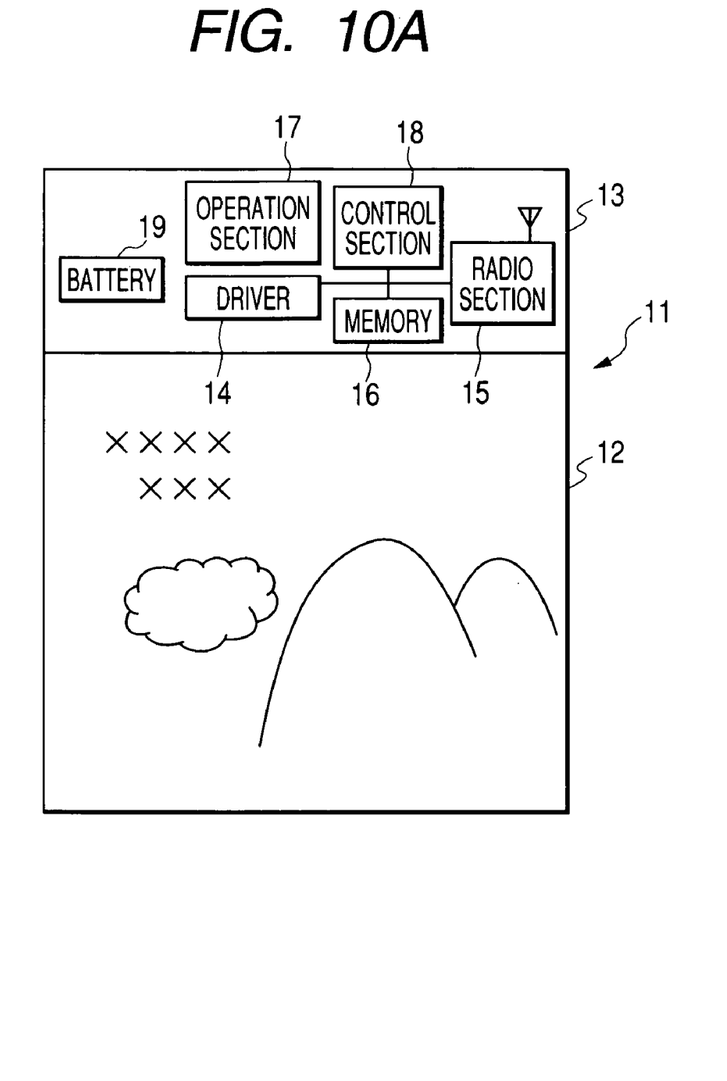
FIGS. 10A and 10B are diagrams showing a self-write-type portable displaying-and-recording medium.
Figure 10B:
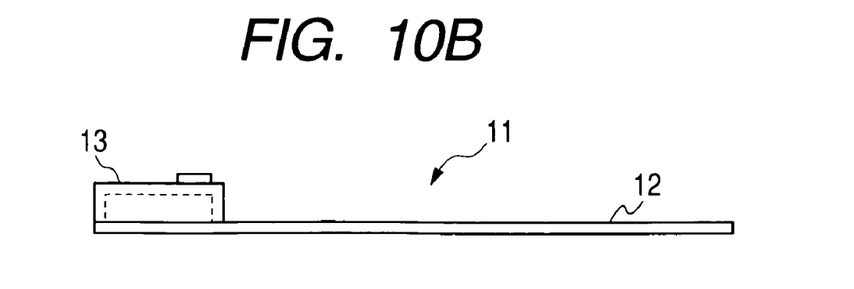

FIG. 10A shows a front view of a self-write-type portable displaying-and-recording medium 11. FIG. 10B shows a side view of the self-write-type portable displaying-and-recording medium 11. The portable displaying-and-recording medium 11 shown in the drawings has a display section 12 for displaying and retaining a content image, and a processing section 13 for processing electronic data. FIG. 10A also shows functional sections built into the processing section 13.

The self-write-type portable displaying-and-recording medium 11 is, as in the case of the external-photo-write-type portable displaying-and-recording medium 1, low-profile, flexible, and of a size of, e.g., A-4 size paper. The processing section 13 is disposed on one portion of the display section 12 which occupies most of the surface area. As is the case of the external-photo-write-type portable displaying-and-recording medium 1, the display section 12 is assumed to be of a suitable size for the purpose.

The processing section 13 has a driver 14 for driving the display section 12, as will be described later, a radio section 15 for effecting data communication by wireless with the outside, a memory 16 for retaining electronic data in a readable/writable manner, an operation section 17 for receiving operation input, or the like, with regard to image data displayed by the driver 14, a control section 18, such as a CPU, for executing functions associated with the invention, and a battery 19 for supplying driving power to the driver 14, the radio section 15, and the memory 16, and the control section 18.

The self-write-type portable displaying-and-recording medium 11 is capable of transceiving electronic data by means of radio communication between the radio section 15 and the outside device (unillustrated), and retaining the electronic data in the memory 16.

Furthermore, in contrast with the external-photo-write-type portable displaying-and-recording medium 1, the self-write-type portable displaying-and-recording medium 11 has the following functions, the driver 14 displays image data on the display section 12 on the basis of electronic data retained in the memory 16, image data to be displayed are switched/changed in accordance with operation input from the operation section 17, and display of image data on the display section 12 is retained even after driving power from the driver 14 is removed.

Figure 12:
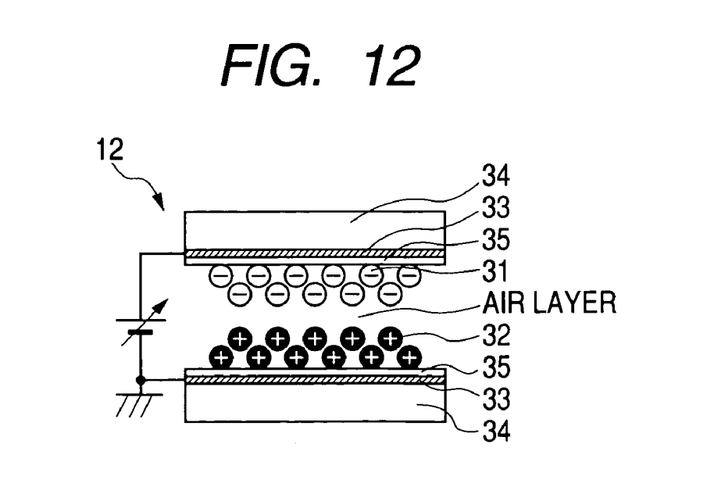
FIG. 12 is a diagram explaining a structure of the self-write-type portable displaying-and-recording medium.

In terms of a cross-sectional structure of the display section 12 shown in FIG. 12, the self-write-type portable displaying-and-recording medium 11 is configured as follows, fine coloring particles (in the illustrated example, white particles 31 and black particles 32) utilized as toner for a copier are sealed between a pair of electrodes 33, of which at least a surface side is transparent, to thereby form a laminated member, and the laminated member is sandwiched between a pair of film substrates 34, of which at least a surface side is transparent. The space between the electrode layers 33 is an air layer, thereby allowing free motion of the coloring particles 31, 32.

Furthermore, an insulation layer 35 for inhibiting contact with the coloring particles 31, 32 is disposed on the electrode layers 33 of a matrix form. A multi-color display can also be realized with a simple structure by means of adopting a color filter.

Figure 11:
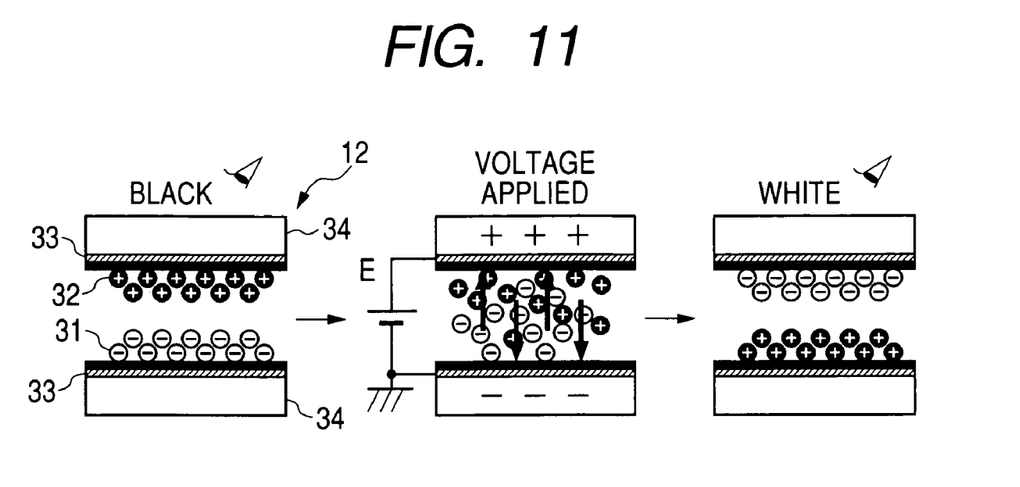
FIG. 11 is a diagram explaining operating principles of the self-write-type portable displaying-and-recording medium.

In terms of operating principles of the display section 12 shown in FIG. 11, in the self-write-type portable displaying-and-recording medium 11, under a state where no voltage is applied on the electrodes 33 (note that the electrodes 33 are charged in the same polarity as used in the previous driving), the negatively charged white particles 31 remain on the back side, and the positively charged black particles 32 remain on the surface side. Accordingly, the display section 12 is black when viewed from the surface side. When the driver 14 is driven in accordance with the electronic data and reverses electrode polarities of desired portions on the matrix in accordance with image data to be displayed, contrast is reversed with regard to the white particles 31 and the black particles 32, whereby image data are displayed on the display section 12 by means of contrast between the white particles 31 and the black particles 32. By driving the driver 14 in accordance with different electronic data, image data displayed on the display section 12 by means of contrast on the white particles 31 and the black particles 32 can be switched, thereby enabling repeated reuse.

As described above, the self-write-type portable displaying-and-recording medium 11 has a characteristic of retaining image data displayed on the display section 12 without power supply, in addition to being paper-thin and flexible. That is, the self-write-type portable displaying-and-recording medium 11 is a recording medium which can be used as if it were paper.

Furthermore, the self-write-type portable displaying-and-recording medium 11 of the embodiment includes a radio function and a notification function performed by means of the control section 18. Therefore, as will be described later by reference to FIG. 1, the self-write-type portable displaying-and-recording medium 11 can notify the management device 50 of a content ID for identifying content displayed and retained in the display section 12, a user ID for identifying an owner user of the portable displaying-and-recording medium 11, and a device ID for identifying the portable displaying-and-recording medium 11. Accordingly, there is constituted an information management system for associating and managing these IDs under predetermined conditions, such as every time content is processed, every time content is recorded/retained in the portable displaying-and-recording medium 11, or every time an owner user of the portable displaying-and-recording medium 11 is changed.

A configuration similar to the above may be adopted, for either the photo-write type or the self-write type, such that functional sections for radio communication and memory, such as the radio section, the memory, and the battery, are configured as another radio IC tag provided separately from the display section of the portable displaying-and-recording medium, and the radio IC tag is attached to the portable displaying-and-recording medium. Furthermore, in the case where the radio IC tag is adopted, the battery may be a capacitor which holds electromotive force from the tag reader.

As is apparent, a portable displaying-and-recording medium of a type other than the self-write type and the photo-write type may be applied in the invention. For instance, there may be used a data storage device which is loaded on an external rewrite device and which, like the self-write type, electronically writes a content image in the display section. In other words, the above-mentioned self-write type is an example of a portable displaying-and-recording medium of a type which does not require an external image write device, and the photo-write type is an example of a portable displaying-and-recording medium of a type which requires an external image write device.

Figure 2:
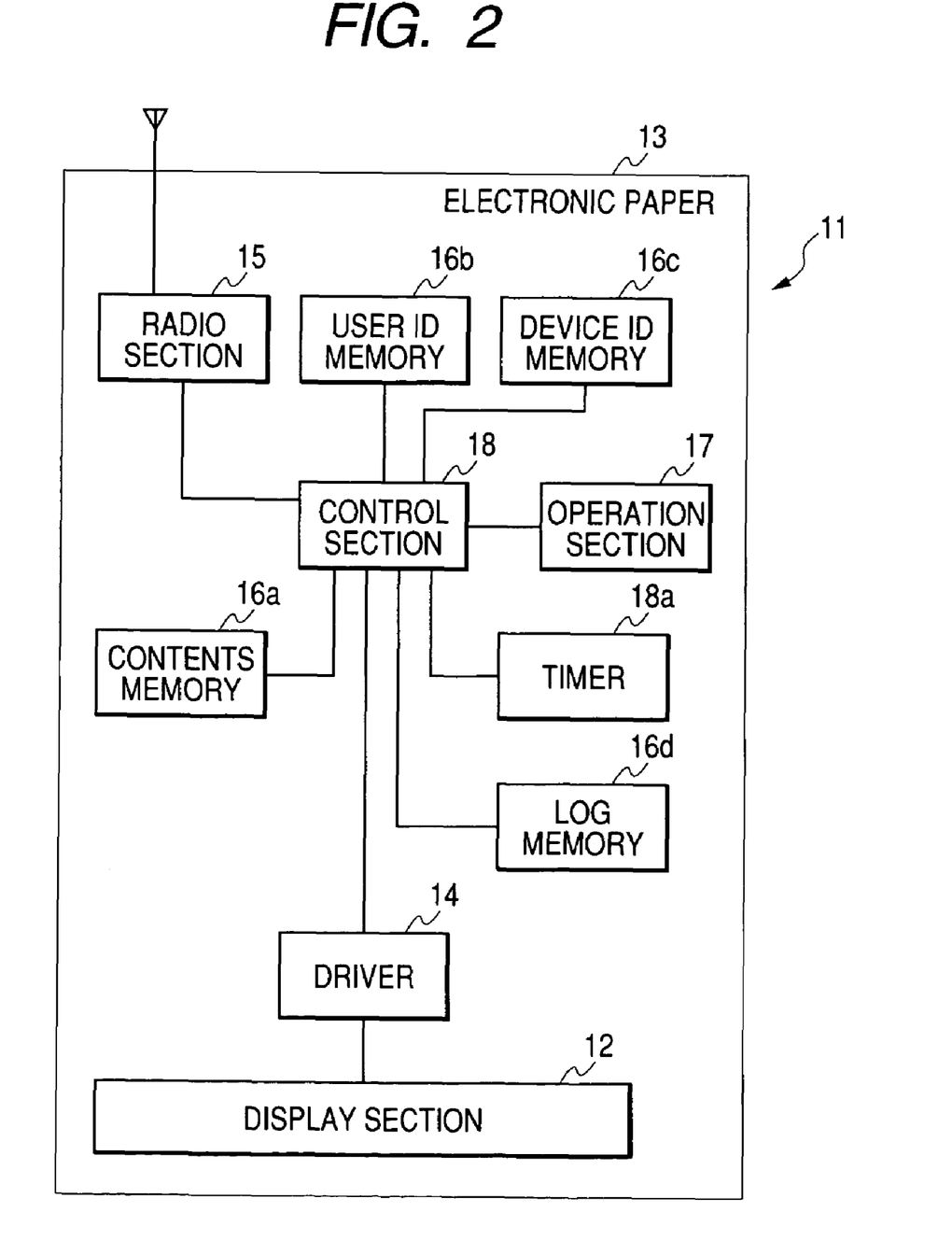
FIG. 2 is a diagram showing a functional configuration of a self-write type portable displaying-and-recording medium according to an embodiment of the invention.

For the display section 2 (12), there may be used liquid crystal having a memory property, such as ferroelectric liquid crystal, an electrophoretic method for switching display by means of moving charged particles, a particle rotation method for switching display by means of rotating charged particles, a magnetic migration method for switching display by means of magnetically moving particles, a thin liquid crystal driven by means of a small battery, or an electroluminescence (EL) element.

Figure 1:
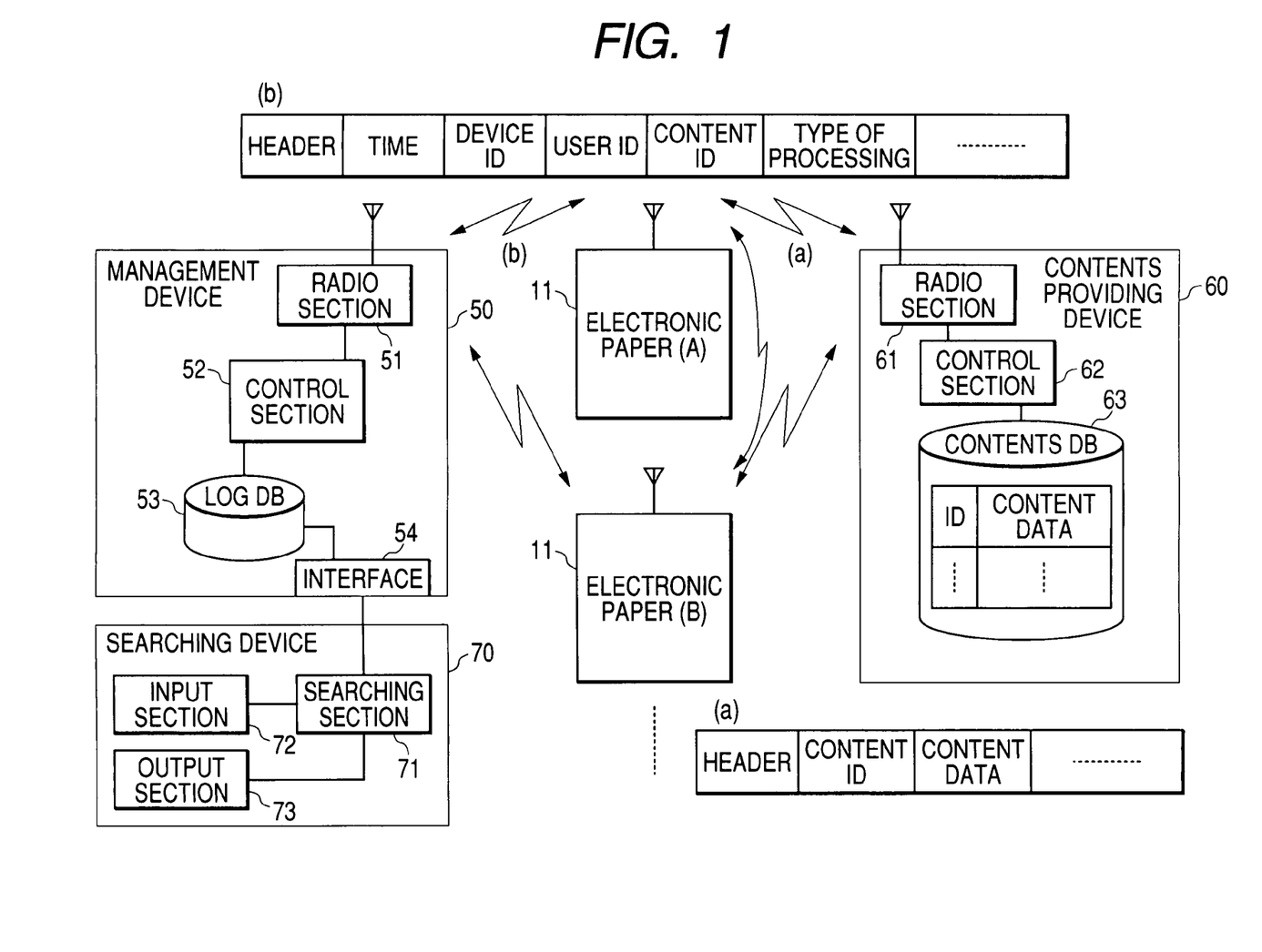
FIG. 1 is a diagram showing an information management system according to an embodiment of the present invention.

FIG. 2 shows a further detailed functional configuration of the processing section 13 of the self-write-type portable displaying-and-recording medium 11 employed in the embodiment of the information management system shown in FIG. 1.

FIGS. 10A and 10B show a basic configuration of the self-write-type portable displaying-and-recording medium 11, however, as shown in FIG. 2, the memory 16 of the processing section 13 includes a contents memory 16a, a user ID memory 16b, a device ID memory 16c, and a log memory 16d. The contents memory 16a stores the content ID for identifying electronic data of a content image displayed and retained in the display section 12, and the respective contents per se. The user ID memory 16b stores the user ID for identifying an owner user who uses the portable displaying-and-recording medium 11. The device ID memory 16c stores the device ID for identifying the portable displaying-and-recording medium 11 per se. The log memory 16d stores data (data (b) in FIG. 1) to be reported to the management device 50, as will be described later. Additionally, a timer 18a which clocks time for obtaining time data necessary for the control section 18 is provided in the control section 18.

In the self-write-type portable displaying-and-recording medium 11, the electronic data of the content to be stored in the contents memory 16a are received from the outside by means of the radio section 15, and the content ID thereof is received as data attached to the content electronic data. The user ID to be stored in the user ID memory 16b and the device ID to be stored in the device ID memory 16c can be set by means of causing the radio section 15 to receive the IDs from the outside in advance of the following notification processing.

According to above-mentioned functional configuration, the portable displaying-and-recording medium 11 constitutes a notification function processed by the control section 18 as described below.

First, when a user performs processing, such as editing, writing, or erasing, of content to be displayed in the display section 12, the control section 18 detects the processing, and transmits to the management device 50, via the radio section 15, a notification which contains at least a user ID stored in the user ID memory 16b, a content ID stored in the contents memory 16a corresponding to the content displayed in the display section 12, and time data concerning the processing clocked by the timer 18a. In other words, the portable displaying-and-recording medium 11 has a function such that every time the user performs processing on the content in the display section 12, a notification indicating that user identification data and content identification data are associated is transmitted to the management device 50.

Accordingly, a record in which the user and the content involved in use of the content are associated conditionally on processing of editing, writing, erasing, or the like, is created and transmitted for notification.

Furthermore, when a user acquires content to be displayed in the display section 12 and records/retains the content in the portable displaying-and-recording medium 11, the control section 18 detects the processing, and transmits, to the management section by way of the radio section 15, a notification which contains at least a content ID stored in the contents memory 16a, a device ID stored in the device ID memory 16c, and time data on the processing clocked by the timer 18a. In other words, the portable displaying-and-recording medium 11 has a function such that every time the content to be displayed in the display section 12 is recorded/retained in the portable displaying-and-recording medium 11, a notification indicating that content identification data and device identification data are associated is transmitted to the management device 50.

Accordingly, when content is used with the use of the portable displaying-and-recording medium 11, a record, in which the portable displaying-and-recording medium 11 and the content are associated conditionally on processing of content acquisition, is created and transmitted for notification.

Furthermore, when an owner of the portable displaying-and-recording medium 11 for recording/retaining the content is changed, the control section 18 detects a user ID of a new owner input from the radio section 15 or the operation section 17, and updates the new user ID in the user ID memory 16b. The control section 18 also transmits to the management device 50 by way of the radio section 15 a notification which contains at least the new user ID, a device ID stored in the device ID memory 16c, and time data on the processing clocked by the timer 18a. In other words, the portable displaying-and-recording medium 11 has a function such that every time the owner of the portable displaying-and-recording medium 11 who uses the content is changed, a notification indicating that user identification data and device identification data are associated is transmitted to the management device 50.

Accordingly, when content is used with the use of the portable displaying-and-recording medium 11, a record indicating that the portable displaying-and-recording medium 11 and the owner user are associated conditionally on owner change is created and transmitted for notification.

Meanwhile, in the embodiment, the portable displaying-and-recording medium has a timer for time management, however, the timer may be provided on the management device 50 side which records corresponding data on the user ID, the device ID, and the content ID in a time-sequential manner upon notification from the portable display medium, not in the portable displaying-and-recording medium. In this case, the following configuration can be taken. The management device 50 receives time data which have been transmitted from the portable displaying-and-recording device in accordance with the above conditions, associates the time data with receipt notification data, and records the same as a log entry along with the time data. Additionally, when content is written into the portable displaying-and-recording medium, as is the above case, the following configuration can be adopted. A timer is provided on the contents providing side (i.e., a contents providing device 60, which will be described later), a device on the contents providing side writes the content data—which contain the provided time data—into the portable displaying-and-recording medium, and the portable displaying-and-recording medium transmits the notification of the identification data—which contain the provided time data.

In the embodiment, the notification data are stored in the log memory 16d, and logs associated with user change or processing of content with regard to the portable displaying-and-recording medium of its own are recorded in the portable displaying-and-recording medium per se, as is the case with the management device 50. Therefore, the portable displaying-and-recording medium alone is capable of processing search, which will be described later, by means of retrieving the data.

More specifically, in the invention, the following configuration can be employed. The management device 50, which will be described later, is not provided, and a function for recording log entries associated with user change or processing of content with regard to the portable displaying-and-recording medium is implemented by the portable displaying-and-recording medium per se without transmission of the above-mentioned notification from the portable displaying-and-recording medium, and searching for the purpose of utilizing the log records is processed by means of accessing the log memory 16*d*. As is apparent, the invention may be configured, as is the case of the system configuration example shown in FIG. 1, such that log entries are primarily recorded in the management device 50 on the basis of notifications from the portable displaying-and-recording medium. In this case, the log memory 16*d* may be obviated, thereby obviating recording of log entries in the portable displaying-and-recording medium side.

Next, an information management system making use of the self-write-type portable displaying-and-recording medium 11 will be described by reference to FIG. 1.

FIG. 1 shows electronic paper A and B, however, plural self-write-type portable displaying-and-recording media 11 can be used in the system. The system includes the management device 50 which records and manages logs upon notification from the portable displaying-and-recording medium 11, the contents providing device 60 which provides the portable displaying-and-recording medium 11 with content data through radio communication, and a searching device 70 which processes search with the use of stored logs in the management device 50.

The management device 50 has a radio transmission section 51, a control section 52, a log database memory (hereinafter, referred to as "log DB") 53, and an interface 54, and receives notification data from the portable displaying-and-recording medium 11. The control section 52 stores the thus-received notification data in the log DB 53. The log entries stored in the log DB 53 can be accessed via the interface 54, via which the searching device 70 is connected thereto.

The searching device 70 has a searching section 71 for performing search processing, an input section 72, such as a keyboard, for receiving search command input from a user, and an output section 73, such as a display screen, for outputting a search result. In accordance with search criteria (for instance, search criteria with a search key of content ID), the searching section 71 accesses the log DB 53, and acquires data which match the search criteria, thereby outputting the same as a search result to the user via the output section 73.

The contents providing device 60 has a radio section 61, a control section 62, and a contents data base memory (hereinafter referred to as "contents DB") 63. The contents DB 63 stores plural content electronic data (hereinafter, referred to as "content data") which are respectively associated with content IDs. In the contents providing device 60, the control section 62 retrieves content data to be distributed and the content ID thereof from the contents DB 63 upon request from the portable displaying-and-recording medium 11, or distribution time or distribution destination data which have been set in the control section 62 in advance. The control section 62 causes the content data and the content ID to contain a header, such as shown in (a) of FIG. 1—which contains destination data, or the like—and transmits the data in the form of a radio frame via the radio section 61 to the corresponding portable displaying-and-recording medium 11.

Accordingly, when the radio frame is received by the self-write-type portable displaying-and-recording medium 11, the content data and the content ID are stored in the contents memory 16*a*. The control section 18 drives the driver 14 and displays a content image from the thus-received content data in the display section 12. The control section 18 also transmits the radio frame (notification data (b) shown in FIG. 1)—which contains receipt time data clocked by the timer 16*d*—via the radio section 15 to the management device 50, and stores the notification data in the log memory 16*d*.

Meanwhile, the self-write-type portable displaying-and-recording medium 11 includes a radio function and a self-write function. Accordingly, content data to be displayed can be exchanged between self-write-type portable displaying-and-recording media. In this case, the control section 18 prepares a radio frame (a) similar to the above from the content data stored in the contents memory 18*a* and the content ID, and transmits the radio frame (a) to a destination self-write-type portable displaying-and-recording medium 11 via the radio section 15. In the destination self-write-type portable displaying-and-recording medium 11, receipt of the content data and notification to the management device 50 are processed in a manner similar to the above.

Meanwhile, the external-photo-write-type portable displaying-and-recording medium 1 can be employed in the information management system. In this case, the following configuration can be adopted. The contents providing device 60, which is provided with means for effecting photo-writing of a content image from content data, as shown in FIG. 7, performs photo-writing of the content image in the display section 2, and transmits a content ID which corresponds to the content image to the portable displaying-and-recording medium 1 by means of radio transmission or wired connection.

An example of notification data transmitted from the portable displaying-and-recording medium 11 to the management device 50 is shown in (a) in FIG. 1. The notification data contains a header which contains destination data for specifying the management device 50, time data acquired from the timer 18*a* as a time of content processing or user change, and type-of-processing data for specifying a type of processing applied to the content including content processing or user change. In addition to the above, the notification data contain at least two of a device ID, a user ID, and content ID in accordance with a type of processing, as will be described below.

Accordingly, by means of sequentially storing the received notification data, log entries—in which at least two of the device ID, user ID, and the content ID are associated—are stored in the log DB 53 in the management device 50 with time data contained.

When the user performs processing, such as acquisition, transfer to another portable displaying-and-recording medium 11, editing, or erasing, on content in the display section 12 in the above, notification data (a) include at least the user ID and the contents ID in addition to the type-of-processing data. When the content is acquired from the contents providing device 60 or another portable displaying-and-recording medium 11, and recorded/retained in the portable displaying-and-recording medium 11 of its own side, notification data (a) include at least the content ID and the device ID of the portable displaying-and-recording medium 11 of its own side in addition to the type-of-processing data. When the owner of the portable displaying-and-recording medium 11 is changed, the notification (a) includes at least the user ID of the new owner and the device ID in addition to the type-of-processing data.

As is apparent, the notification data may contain two or more pieces of ID data.

As described above, when any change is made in the portable displaying-and-recording medium 11, time data on each change, type-of-processing data for specifying the content of the change, and ID data for specifying a subject and an object involved in the change are stored in the log DB 53 of the management device 50.

Search across the log DB 53 with a search key of any of the ID data by way of the searching device 70 allows ascertainment of changes in the user per se, the content, and the portable displaying-and-recording medium 11 per se in an environment where the content data are utilized with the use of the portable displaying-and-recording medium 11. Since these changes are results of actions and intentions of the user, such data allows such ascertainment, thereby enabling analysis of actions of the user.

Figure 3A:
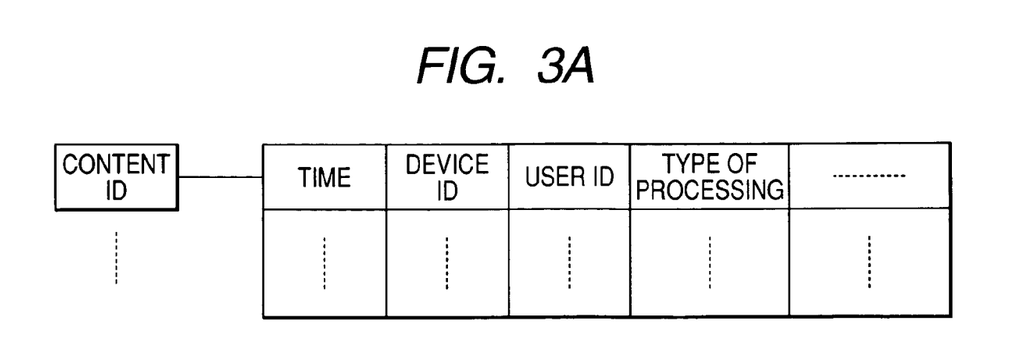
FIGS. 3A to 3C are diagrams explaining search results according to an embodiment of the invention.
Figure 3B:
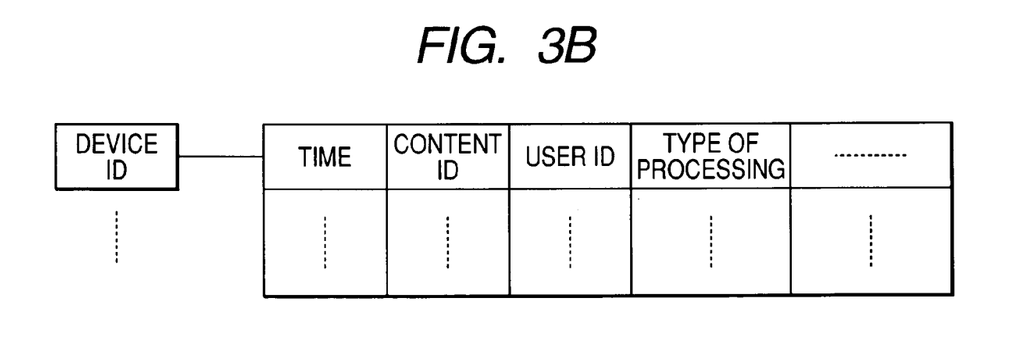
Figure 3C:
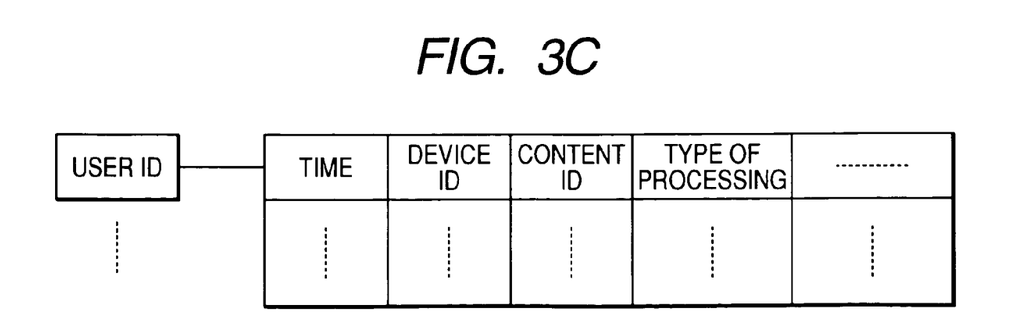

FIGS. 3A to 3B show conceptual diagrams of search results. FIG. 3A shows a case where search is performed with a search key of a content ID. FIG. 3B shows a case where search is performed with a search key of a device ID. FIG. 3C shows a case where search is performed with a search key of a user ID.

The search result in which the content ID is the search key is time-series data in accordance with time data. The result shows, with regard to a certain content, changes in portable displaying-and-recording media 11 which have acquired or processed the content, or changes in users who have acquired or processed the content.

The search result in which the device ID is the search key is time-series data in accordance with time data. The result shows, with regard to a certain portable displaying-and-recording medium, changes in contents which have been acquired or processed with the use of the device, or changes in users who have possessed the device.

The search result in which the user ID is the search key is time-series data in accordance with time data. The result shows, with regard to a certain user, changes in portable displaying-and-recording media which have been possessed by the user, or changes in contents which have been acquired or processed with the use of the device.

Figure 4:
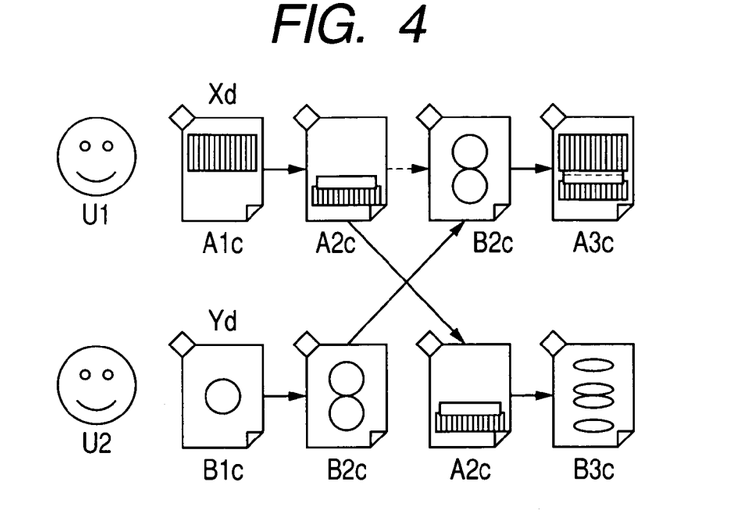
FIG. 4 is a diagram explaining a specific example according to an embodiment of the invention.

As a more specific example, FIG. 4 shows a condition where content is subjected to processing by means of portable displaying-and-recording media between a user U1 who possesses and uses a portable displaying-and-recording medium Xd and a user U2 who possesses and uses a portable displaying-and-recording medium Yd.

Assume that the user U1 switches content displayed in the portable displaying-and-recording medium Xd from A1c to A2c, and the user U2 switches content displayed in the portable displaying-and-recording medium Yd from B1c to B2c. Further, assume that contents to be displayed are exchanged between the portable displaying-and-recording medium Xd of the user U1 and the portable displaying-and-recording medium Yd of the user U2 by means of radio communication, content displayed in the portable displaying-and-recording medium Xd is switched to the content B2c, and content displayed in the portable displaying-and-recording medium Yd is switched to the content A2c; and furthermore, content displayed in the portable displaying-and-recording medium Xd is switched to content A3c, and content displayed in the portable displaying-and-recording medium Yd is switched to content B3c.

Such processing with regard to contents is stored in the log DB 53 as described above, and, for instance, when search is performed with a search key of the portable displaying-and-recording medium Xd, the searching device 70 shows that the content displayed has changed as follows, A1c, A2c, B2c, A3c. When search is performed with a search key of the portable displaying-and-recording medium Yd, the searching device 70 shows that content has changed as follows, B1c, B2c, A2c, B3c.

Furthermore, for instance, when search is performed with a search key of the content A2c, the search result shows that the user has been changed from U1 to U2, and the portable displaying-and-recording medium has been changed from Xd to Yd.

Figure 5:
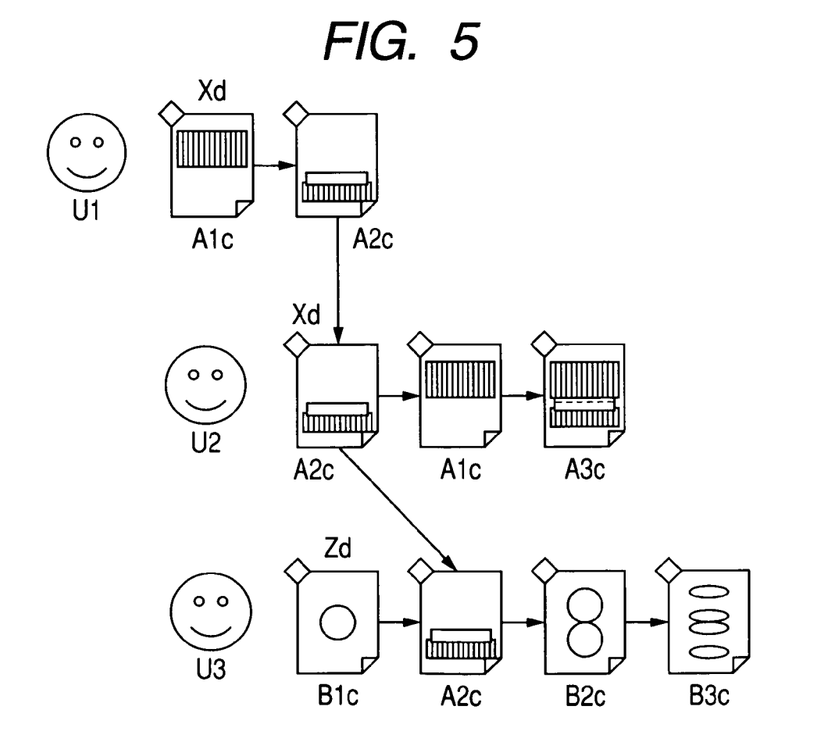
FIG. 5 is a diagram explaining another specific example according to an embodiment of the invention.

As another more specific example, FIG. 5 shows a condition where content is subjected to processing with the use of portable displaying-and-recording media among a user U1 who possesses and uses a portable displaying-and-recording medium Xd, a user U3 who possesses and uses a portable displaying-and-recording medium Zd, and a user U2 who initially does not possess a portable displaying-and-recording medium.

Assume that the user U1 switches content displayed in the portable displaying-and-recording medium Xd from A1c to A2c, and passes the portable displaying-and-recording medium Xd to the user U2, and changes the owner user ID. Assume that, subsequently, the new user U2 switches content displayed in the portable displaying-and-recording medium Xd from A2c to A1c, and further, from A1c to A3c. Meanwhile, assume that the user U3 switches content displayed in the portable displaying-and-recording medium Zd from B1c to the content A2c which has been acquired from the portable displaying-and-recording medium Xd, and thereafter switches the displayed content from A2c to B2c, and further, to B3c.

Such processing with regard to contents is stored in the log DB 53 as described above, and, for instance, when search is performed with a search key of the content A2c, the searching device 70 shows that the portable displaying-and-recording medium where the content A2c has been used has transited from Xd to Zd, and the user has transited from U1, to U2, and to U3.

Furthermore, for instance, when search is performed with a search key of the device Xd, the search result shows that the owner of the portable displaying-and-recording medium Xd has been transited from U1 to U2.

The entire disclosure of Japanese Patent Application No. 2004-077570 filed on Mar. 18, 2004 including specification, claims, drawings and abstract is incorporated herein by reference in its entirety.

What is claimed is:

1. An information management system which enables analysis on basis of a processing history of content with use of a portable displaying-and-recording medium, comprising:

a storage section; and a control section that, when a process is performed for content display on the portable displaying-and-recording medium, stores user identification data to specify a user who owns the portable displaying-and-recording medium and content identification data to specify content displayed on the portable displaying-and-recording medium after the process, in an associated manner in the storage section, wherein the portable displaying-and-recording medium retains data in a state where content is displayed and is capable of rewriting the thereon; and a search section that searches the user identification data and the content identification data which have been stored in the storage section by the control section, and that outputs a processing history of content for each user or a history of a user for each content.

2. The information management system according to claim 1, wherein the portable displaying-and-recording medium has a communication section that notifies the control section of the user identification data and the content identification data when the process is performed for the content, and upon receipt of the notification from the portable displaying-and-recording medium, the control section stores the user identification data and the content identification data in the associated manner along with time data.

3. The information management system according to claim 2, further comprising:

a search section that searches the user identification data and the content identification data which have been stored in the storage section by the control section, and that outputs a processing history of content for each user or a history of a user for each content.

4. An information management system which enables analysis on basis of a processing history of content with use of a portable displaying-and- recording medium, comprising:

a storage section; and a control section that, when the portable displaying-and-recording medium is caused to retain content, stores content identification data to specify content displayed on the portable displaying-and-recording medium and device identification data to specify the portable displaying-and-recording medium in an associated manner in the storage section, wherein the portable displaying-and-recording medium retains content in a state where the content is displayed thereon, and the portable displaying-and-recording medium is capable of rewriting the content displayed thereon;

a search section that searches the content identification data and the device identification data which have been stored in the storage section by the control section, and that outputs (i) a history, for each content, of the portable displaying-and-recording medium in which each content has been retained, or (ii) a history, for a plurality of portable displaying-and-recording media, of contents which have been retained in each portable displaying-and-recording medium.

5. The information management system according to claim 4, wherein the portable displaying-and-recording medium has a communication section that notifies the control section of the content identification data and the device identification data when the portable displaying-and-recording medium is caused to retain the content, and upon receipt of the notification from the portable displaying-and-recording medium, the control section stores the content identification data and the device identification data in the associated manner along with time data.

6. The information management system according to claim 5, further comprising:

a search section that searches the content identification data and the device identification data, which have been stored in the storage section by the control section and that outputs (i) a history, for each content, of the portable displaying-and-recording medium in which each content has been retained, or (ii) a history, for each portable displaying-and-recording medium, of contents which have been retained in each portable displaying-and-recording medium.

7. An information management system which enables analysis on basis of a processing history of content with use of a plurality of portable displaying-and-recording media, each portable displaying-and-recording medium, comprising:

a storage section; and a control section that, when a user who owns the portable displaying-and-recording medium which retains the content is changed, stores device identification data to specify the portable displaying-and-recording medium in which content has been retained and user identification data to specify a user who owns the portable displaying-and-recording medium, in an associated manner in the storage section, wherein the portable displaying-and-recording medium retains data in a state where content of the data is displayed thereon; and a search section that searches the device identification data and the user identification data, which have been stored in the storages section by the control section. and that outputs a history, for each portable displaying-and-recording medium, of a user who owns the plurality of portable displaying-and-recording media or a history, for each user, of the portable displaying-and-recording medium owned by each user.

8. The information management system according to claim 7, wherein the portable displaying-and-recording medium has a communication section that notifies the control section of the device identification data and the user identification data when the user who owns the portable displaying-and-recording medium which retains the content is changed, and upon receipt of the notification from the portable displaying-and-recording medium, the control section stores the device identification data and the user identification data in the associated manner along with time data.

9. The information management system according to claim 8, further comprising:

a search section that searches the device identification data and the user identification data, which have been stored in the storage section by the control section, and that outputs a history, for each portable displaying-and-recording medium, of a user who owns each portable displaying-and-recording medium or a history, for each user, of each portable displaying-and-recording medium owned by each user.

10. An information management method for analysis on the basis of a processing history of content with use of a portable displaying-and-recording medium, comprising:

notifying a management device via the portable displaying-and-recording medium of user identification data and content identification data when a process is performed on content; and upon receipt of the notification from the portable displaying-and-recording medium, storing the user identification data and the content identification data in an associated manner along with time data wherein the portable displaying-and-recording medium retains data in a state where content of the data is displayed thereon, and the portable displaying-and-recording medium is capable of rewriting the content displayed thereon; and searching the device identification data and the user identification data, which are stored in the storage section by the control section. to output a history, for a plurality of portable displaying-and-recording media, of a user who owns each portable displaying-and- recording medium or a history, for each user, of the portable displaying-and-recording medium that each user owns.

11. The information management method according to claim 10, further comprising:
searching the stored user identification data and the stored content identification data to output a process history of content for each user or a history of a user for each content.

12. An information management method for analysis on the basis of a processing history of content with use of a portable displaying-and-recording medium, comprising:
notifying content identification data and device identification data via the portable displaying-and-recording medium when the portable displaying-and-recording medium is caused to retain content, and
upon receipt of the notification from the portable displaying-and-recording medium, storing the content identification data and the device identification data in an associated manner along with time data,
wherein the portable displaying-and-recording medium retains data in a state where content of the data is displayed thereon, and
the portable displaying-and-recording medium is capable of rewriting the content; and
searching the content identification data and the device identification data, which are stored in the storage section by the control section, to output (i) a history, for each content, of the portable displaying-and-recording medium in which each content has been retained or (ii) a history, for a plurality of portable displaying-and-recording media, of contents which have been retained in each portable displaying-and-recording medium.

13. An information management method for analysis on the basis of a processing history of content with use of a portable displaying-and-recording medium, comprising:
notifying device identification data and user identification data via the portable displaying-and-recording medium when a user who owns the portable displaying-and-recording medium which retains content is changed; and
upon receipt of the notification from the portable displaying-and-recording medium, storing the device identification data and the user identification data, in an associated manner along with time data,
wherein the portable displaying-and-recording medium retains data in a state where content of the data is displayed thereon; and
searching the content identification data and the device identification data, which are stored in the storage section by the control section, to output (i) a history, for each content, of the portable displaying-and-recording medium in which each content has been retained or (ii) a history, for a plurality of portable displaying-and-recording media, of contents which have been retained in each portable displaying-and-recording medium.

* * * * *